United States Patent
Shinohara et al.

(10) Patent No.: US 11,136,503 B2
(45) Date of Patent: Oct. 5, 2021

(54) METHOD FOR PRODUCING NITRIDE FLUORESCENT MATERIAL

(71) Applicant: NICHIA CORPORATION, Anan (JP)

(72) Inventors: Takayuki Shinohara, Anan (JP); Hiroyuki Watanabe, Itano-gun (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 39 days.

(21) Appl. No.: 16/801,626

(22) Filed: Feb. 26, 2020

(65) Prior Publication Data

US 2020/0270519 A1   Aug. 27, 2020

(30) Foreign Application Priority Data

Feb. 27, 2019 (JP) .............................. JP2019-034238

(51) Int. Cl.
*C09K 11/77* (2006.01)
*C09K 11/08* (2006.01)

(52) U.S. Cl.
CPC ...... *C09K 11/7734* (2013.01); *C09K 11/0883* (2013.01); *C09K 11/77348* (2021.01)

(58) Field of Classification Search
CPC .......... C09K 11/77348; C09K 11/7734; C09K 11/0883
See application file for complete search history.

(56) References Cited

U.S. PATENT DOCUMENTS

| | | |
|---|---|---|
| 2010/0164365 A1 | 7/2010 | Yoshino et al. |
| 2010/0213822 A1 | 8/2010 | Shimooka et al. |

FOREIGN PATENT DOCUMENTS

| | | |
|---|---|---|
| JP | 2008088399 A | 4/2008 |
| JP | 2008156656 A | 7/2008 |
| JP | 2009057554 A | 3/2009 |
| JP | 2009108327 A | 5/2009 |
| JP | 2009263201 A | 11/2009 |
| JP | 2009263610 A | 11/2009 |
| JP | 2015218315 A | 12/2015 |
| WO | 2007091687 A1 | 8/2007 |
| WO | 2009017206 A1 | 2/2009 |
| WO | 2015001860 A1 | 1/2015 |

*Primary Examiner* — C Melissa Koslow

(74) *Attorney, Agent, or Firm* — Hunton Andrews Kurth LLP

(57) ABSTRACT

Provided is a method for producing a nitride fluorescent material including: preparing a raw material mixture including a hydride containing at least one first alkaline earth metal element, at least one compound containing at least one second alkaline earth metal element and selected from an amide compound and an imide compound, a compound containing europium, a compound containing aluminum, and a compound containing silicon, wherein at least one of the compound containing europium, the compound containing aluminum, and the compound containing silicon is a nitride; and subjecting the raw material mixture to a heat treatment to obtain the nitride fluorescent material.

10 Claims, 1 Drawing Sheet

METHOD FOR PRODUCING NITRIDE FLUORESCENT MATERIAL

CROSS-REFERENCE TO RELATED PATENT APPLICATION

This application claims priority to Japanese Patent Application No. 2019-034238, filed on Feb. 27, 2019, the disclosure of which is hereby incorporated by reference in its entirety.

BACKGROUND

Technical Field

The present disclosure relates to a method for producing a nitride fluorescent material. In this specification, the "fluorescent material" is used in the same meaning as a "fluorescent phosphor".

Description of Related Art

A light emitting device constituted by combining a light emitting diode (hereinafter also referred to as "LED") with a fluorescent material is actively applied to lighting systems, and backlights for liquid crystal display devices, and is becoming popular. As a nitride fluorescent material used for the light emitting device, for example, $(Sr_2,Ca)AlSiN_3$:Eu disclosed in International Unexamined Patent Publication No. 2015/001860 is known.

The nitride fluorescent material is required to be further improved in light emission intensity.

Thus, an embodiment of the present disclosure provides a nitride fluorescent material having improved light emission intensity.

SUMMARY

The present disclosure includes the following embodiment.

A first embodiment of the present disclosure is a method for producing a nitride fluorescent material including:
preparing a raw material mixture comprising a hydride containing at least one first alkaline earth metal element, at least one compound containing at least one second alkaline earth metal element and selected from the group consisting of an amide compound and an imide compound, a compound containing europium, a compound containing aluminum, and a compound containing silicon, wherein at least one of the compound containing europium, the compound containing aluminum, and the compound containing silicon is a nitride; and subjecting the raw material mixture to a heat treatment to obtain the nitride fluorescent material. The at least one first alkaline earth metal element and the at least one second alkaline earth metal element may be the same or different.

In accordance with the embodiment of the present disclosure, a nitride fluorescent material having improved light emission intensity can be obtained.

DETAILED DESCRIPTION

Figure 1:
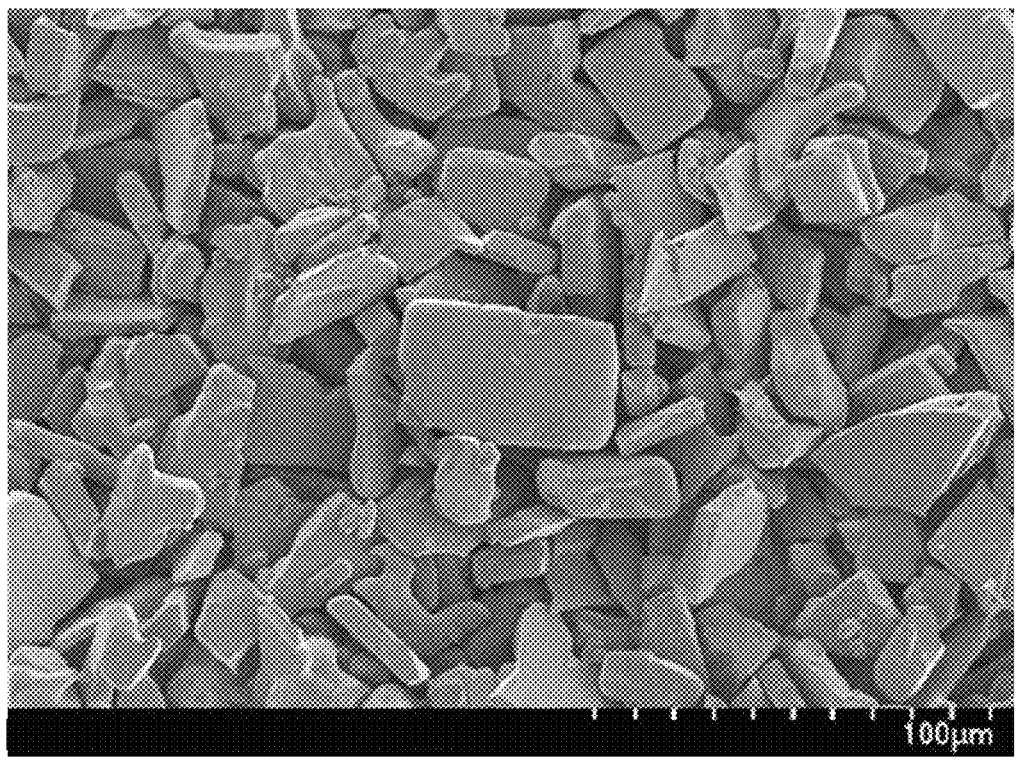
FIG. 1 is a scanning electron microscope (SEM) micrograph of a nitride fluorescent material according to Example 3 of the present disclosure.

The method for producing a nitride fluorescent material according to the present disclosure will be hereunder described on the basis of embodiments thereof. The embodiments shown below are exemplifications for embodying the technical idea of the present disclosure, and the present disclosure is not limited to the method for producing a nitride fluorescent material described below. In this description, standards according to Japanese Industrial Standard (JIS) Z8110 are applied to the relations between color names and chromaticity coordinates, the relations between wavelength ranges of light and color names of monochromatic lights.

The method for producing a nitride fluorescent material according to the present disclosure may include: preparing a raw material mixture comprising a hydride containing at least one first alkaline earth metal element, at least one compound containing at least one second alkaline earth metal element and selected from the group consisting of an amide compound and an imide compound, a compound containing europium, a compound containing aluminum, and a compound containing silicon, wherein at least one of the compound containing europium, the compound containing aluminum, and the compound containing silicon is a nitride; and subjecting the raw material mixture to a heat treatment to obtain the nitride fluorescent material. The at least one first alkaline earth metal element and the at least one second alkaline earth metal element may be the same or different.

Preparation of Raw Material Mixture

As a raw material, the hydride containing at least one first alkaline earth metal element is a compound having a larger mass ratio of the alkaline earth metal element contained in one mole than that of the nitride containing at least one alkaline earth metal element. Among the alkaline earth metal elements, Ca, Sr, and Ba tend to have a lower melting point as the ionic radius increases. Thus, the alkaline earth metal elements are readily scattered by heat treatment, the elements tend to be insufficient than a stoichiometric composition, and crystal defects tend to occur. By using the hydride containing at least one first alkaline earth metal element as a raw material, the alkaline earth metal element constituting the framework of the crystal structure of the fluorescent material can be sufficiently supplied. Therefore, the crystal structure with few defects can be provided to promote the crystal growth, and a nitride fluorescent material having a relatively large particle diameter and improved light emission intensity can be obtained. Also, as for the hydride containing at least one first alkaline earth metal element, when the raw material mixture is heat-treated, hydrogen contained in the hydride reacts with oxygen in the heat treatment atmosphere to become moisture, and is readily released to the outside of the reaction system. Therefore, oxygen and the like are hardly incorporated in the composition of the nitride fluorescent material to be obtained, and a nitride fluorescent material having a small content of elements other than the target composition such as oxygen, which may cause a decrease in light emission characteristics, can be obtained. For example, when the at least one element selected from the group consisting of the alkaline earth metal elements is Sr, $SrH_2$ that is a hydride has a mass ratio of Sr contained in one molecule of 97.8%. Meanwhile, $Sr_2N$ that is a nitride has a mass ratio of Sr contained in one molecule of 92.6%, and $Sr_3N_2$ has a mass ratio of Sr contained in one molecule of 90.3%. $SrH_2$ that is a hydride has a larger mass ratio of Sr contained in one molecule than those of $Sr_2N$ and $Sr_3N_2$ that are nitrides.

As a raw material, the at least one compound containing at least one second alkaline earth metal element and selected from the group consisting of an amide compound and an imide compound is a compound having a larger mass ratio of nitrogen contained in one molecule than that of the nitride containing at least one alkaline earth metal element. By using the at least one compound containing at least one second alkaline earth metal element and selected from the group consisting of an amide compound and an imide compound as a raw material, nitrogen can be also sufficiently supplied along with the alkaline earth metal element such that a composition to be obtain is close to the stoichiometric composition. By obtaining the composition closer to the stoichiometric composition, a crystal structure with few defects can be provided to promote the crystal growth, and a nitride fluorescent material having a relatively large particle diameter and excellent light emission intensity can be obtained. For example, when the at least one element selected from the group consisting of the alkaline earth metal elements is Sr, SrNH that is an amide compound has a mass ratio of nitrogen contained in one molecule of 13.6%, and $Sr(NH_2)_2$ that is an imide compound has a mass ratio of nitrogen contained in one molecule of 23.5%. Meanwhile, $Sr_2N$ that is a nitride has a mass ratio of nitrogen contained in one molecule of 7.4%, and $Sr_3N_2$ has a mass ratio of nitrogen contained in one molecule of 9.6%. Each of SrNH that is an amide compound and $Sr(NH_2)_2$ that is an imide compound has a larger mass ratio of nitrogen contained in one molecule than those of $Sr_2N$ and $Sr_3N_2$ that are nitrides.

Examples of the hydride containing at least one first alkaline earth metal element may include at least one selected from the group consisting of $MgH_2$, $CaH_2$, $SrH_2$, $BaH_2$, $(Sr,Ca)H_2$, and $(Sr,Ca,Eu)H_2$. In the present specification, plural elements sectioned by comma (,) in the formula representing the composition of a compound may contain at least one of these plural elements in the composition, and may contain two or more of these plural elements in combination.

The hydride containing at least one first alkaline earth metal element preferably contains at least one of Sr and Ca, and is more preferably at least one selected from the group consisting of $SrH_2$, $CaH_2$, $(Sr,Ca)H_2$, and $(Sr,Ca,Eu)H_2$. Among the alkaline earth metal elements, Sr and Ca have a low melting point, and thus tend to be scattered during heat treatment. As for the compound containing Sr and Ca which are relatively readily scattered elements among the alkaline earth metal elements, by using a hydride in which the mass ratios of Sr and Ca contained in the compound are larger than that of, for example, nitride as a raw material, the elements constituting the crystal structure can be sufficiently supplied, the crystal structure with few defects can be provided to promote the crystal growth, and a nitride fluorescent material having a relatively large particle diameter and high light emission intensity can be obtained.

The at least one compound containing at least one second alkaline earth metal element and selected from the group consisting of an amide compound and an imide compound preferably contains one of Sr and Ca, and is more preferably at least one selected from the group consisting of $Sr(NH_2)_2$, $Ca(NH_2)_2$, $(Sr,Ca)(NH_2)_2$, $(Sr,Ca,Eu)(NH_2)_2$, SrNH, CaNH, (Sr,Ca)NH, and (Sr,Ca,Eu)NH. As for the compound containing at least one of Sr and Ca which have a relatively large ionic radius and are readily scattered elements among the alkaline earth metal elements, by using at least one selected from the group consisting of an amide compound and an imide compound in which the mass ratio of nitrogen contained in the compound is larger than that of nitride as a raw material, nitrogen serving as an element constituting the crystal structure can be also sufficiently supplied along with at least one of Sr and Ca such that the composition to be obtained is close to the stoichiometric composition. By obtaining the composition to closer to the stoichiometric composition, the crystal structure with few defects can be provided. Thereby, the crystal growth is also promoted, and a nitride fluorescent material having a relatively large particle diameter and excellent light emission intensity can be obtained.

The blending ratio of the hydride containing at least one first alkaline earth metal element relative to the total, which is 100% by mass, of the hydride containing at least one first alkaline earth metal element and the at least one compound containing at least one second alkaline earth metal element and selected from the group consisting of an amide compound and an imide compound is preferably in a range of 20% by mass or more and 80% by mass or less. When the blending ratio of the hydride relative to the total of the hydride and the at least one compound selected from the group consisting of an amide compound and an imide compound falls within a range of 20% by mass or more and 80% by mass or less, the alkaline earth metal element and nitrogen serving as elements constituting the crystal structure can be also sufficiently supplied, the crystal structure with few defects can be provided to promote the crystal growth, and a nitride fluorescent material having a relatively large particle diameter and excellent light emission intensity can be obtained. The blending ratio of the hydride relative to the total of the hydride and the at least one compound selected from the group consisting of an amide compound and an imide compound is more preferably in a range of 25% by mass or more and 75% by mass or less.

As the hydride containing at least one first alkaline earth metal element and the at least one compound containing at least one second alkaline earth metal element and selected from the group consisting of an amide compound and an imide compound, commercially available compounds or produced compounds may be used. As for the hydride, at least one alkaline earth metal can be heat-treated in an inert atmosphere containing hydrogen to obtain the hydride. As for the at least one compound selected from the group consisting of an amide compound and an imide compound, at least one alkaline earth metal can be heat-treated in an atmosphere containing nitrogen and hydrogen to obtain the at least one compound selected from the group consisting of an amide compound and an imide compound. The purity of each of the hydride containing at least one first alkaline earth metal element and the at least one compound selected from the group consisting of an amide compound and an imide compound is preferably 95% by mass or more, more preferably 98% by mass or more, even more preferably 99% by mass or more, particularly preferably 99.5% by mass or more, for the purpose of reducing impurities contained in the resulting nitride fluorescent material.

The raw material mixture may contain a compound containing at least one alkaline earth metal element in addition to the hydride containing at least first one alkaline earth metal element and the at least one compound containing at least one second alkaline earth metal element and selected from the group consisting of an amide compound and an imide compound. Examples of the compound containing at least one alkaline earth metal element may include oxides, hydroxides, nitrides, oxynitrides, and chlorides. Since the amount of impurities in the nitride fluorescent material can be reduced, the compound containing at least one alkaline earth metal element other than the hydride, amide compound, and imide compound is preferably a nitride. When the raw material mixture contains the compound containing at least one alkaline earth metal element other than the hydride, amide compound, and imide compound, the content of the compound other than the hydride, amide compound, and imide compound relative to the total, which is 100% by mass, of the compounds containing the alkaline earth metal elements contained in the raw material mixture is preferably 10% by mass or less, more preferably 5% by mass or less, even more preferably 3% by mass or less, still more preferably 2% by mass or less, particularly preferably 1% by mass or less. The compound containing at least one alkaline earth metal element other than the hydride, amide compound, and imide compound may contain at least one element selected from the group consisting of Li, Na, K, B, and Al as long as the characteristics of the fluorescent material to be obtained are not deteriorated.

The raw material mixture contains a compound containing europium, a compound containing aluminum, and a compound containing silicon; and at least one of the compound containing europium, the compound containing aluminum, and the compound containing silicon is a nitride. When at least one of the compounds contained in the raw material mixture is a nitride, nitrogen can be sufficiently supplied such that the composition to be obtain is close to the stoichiometric composition, and a nitride fluorescent material having a crystal structure with suppressed defects can be obtained.

Examples of the compound containing europium, the compound containing aluminum, and the compound containing silicon may include nitrides, hydrides, oxynitrides, oxides, hydroxides, fluorides, chlorides, amide compounds, and imide compounds. The purity of each compound is preferably 95% by mass or more, more preferably 98% by mass or more, even more preferably 99% by mass or more, particularly preferably 99.5% by mass or more. The higher the purity of each compound, the more the impurities contained in the nitride fluorescent material to be obtained can be reduced.

Examples of the compound containing europium may include $Eu_2O_3$, EuN, $EuF_3$, $EuH_3$, and $EuCl_3$. The raw material mixture may contain a europium simple substance. $Eu_2O_3$ and $EuF_3$ also act as a flux. One alone or two or more of the compounds containing europium may be used either singly or in combination. The compound containing europium may be a compound in which at least a part of europium is substituted with a rare earth element as long as the characteristics of the fluorescent material to be obtained are not deteriorated. Examples of the rare earth element may include at least one rare earth element selected from the group consisting of Sc, Y, La, Ce, Pr, Nd, Sm, Gd, Tb, Dy, Ho, Er, Tm, Yb, and Lu.

Examples of the compound containing aluminum may include AlN, $AlH_3$, $AlF_3$, $LiAlH_4$, $Al_2O_3$, and $AlCl_3$. The raw material mixture may contain an aluminum simple substance. One alone or two or more of the compounds containing aluminum may be used either singly or in combination. The compound containing aluminum may be a compound in which at least a part of aluminum is substituted with a Group-13 element or a metal element capable of having a trivalent valence of the fourth period as long as the characteristics of the fluorescent material to be obtained are not deteriorated. Examples of the Group-13 element or the metal element capable of having a trivalent valence of the fourth period may include at least one metal element selected from the group consisting of Ga, In, V, Cr, and Co.

Examples of the compound containing silicon may include $SiO_2$, $Si_3N_4$, $Si(NH)_2$, $Si_2N_2NH$, and $Si(NH_2)_4$. The raw material mixture may contain a silicon simple substance. One alone or two or more of the compounds containing silicon may be used either singly or in combination. The compound containing silicon may be a compound in which at least a part of silicon is substituted with a Group-14 element or a metal element capable of having a tetravalent valence of the fourth period as long as the characteristics of the fluorescent material to be obtained are not deteriorated. Examples of the Group-14 element or the metal element capable of having a tetravalent valence of the fourth period may include at least one metal element selected from the group consisting of Ge, Sn, Ti, Zr, and Hf.

The raw material mixture preferably contains a nitride containing europium, a nitride containing aluminum, a nitride containing silicon, and optionally a nitride containing at least one alkaline earth metal element. When the compound contained in the raw material mixture is a nitride, the amount of elements other than the target composition contained in the nitride fluorescent material to be obtained can be reduced. Specific examples of the nitride containing europium, the nitride containing aluminum, and the nitride containing silicon may include EuN, AlN, $Si_3N_4$, $Ca_3N_2$, and $Ba_3N_2$.

As the nitride containing europium, the nitride containing aluminum, and the nitride containing silicon, commercially available compounds or produced compounds may be used. The europium nitride can be obtained, for example, by grinding a europium simple substance serving as a raw material in an inert gas atmosphere and heat-treating the resulting powder in a nitrogen atmosphere or an ammonium atmosphere. The aluminum nitride can be obtained, for example, by a direct nitriding method. The silicon nitride can be obtained, for example, by grinding a silicon simple substance serving as a raw material in an inert gas atmosphere and heat-treating the resulting powder in a nitrogen atmosphere.

The raw material mixture is preferably prepared in such a manner that, when a molar ratio of aluminum in the raw material mixture is defined as 1, a molar ratio of europium in the raw material mixture is in a range of more than 0 and 0.04 or less, a total molar ratio of the at least one first alkaline earth metal element, the at least one second alkaline earth metal element, and europium in the raw material mixture is in a range of 0.8 or more and 1.2 or less, and a molar ratio of silicon in the raw material mixture is in a range of 0.8 or more and 1.2 or less. By mixing each raw material such that the molar ratio of each element in the raw material mixture falls within the above range and preparing the raw material mixture, a nitride fluorescent material having a desired composition ratio can be formed.

The alkaline earth metal element contained in the raw material mixture preferably contains at least one of Sr and Ca, and more preferably contains Sr, for the purpose of obtaining a nitride fluorescent material having a stable crystal structure and a desired chromaticity. When the alkaline earth metal element contained in the raw material mixture contains Sr, an alkaline earth metal element other than Sr (hereinafter, the alkaline earth metal element other than Sr is also referred to as "element $M^a$") may be contained. When the alkaline earth metal element contained in the raw material mixture contains Sr and the element $M^a$, the element $M^a$ is an element constituting the host crystal of the nitride fluorescent material along with Sr, Al, Si, and N. The element $M^a$ is at least one element selected from the group consisting of Ca, Ba, and Mg.

Each compound used as a raw material is preferably prepared such that the elements contained in the raw material mixture constitute a charge-in composition represented by the following formula (Ia).

$$M_i^a Sr_j Eu_k Si_l AlN_m \quad (Ia)$$

wherein $M^a$ represents at least one element selected from the group consisting of Ca, Ba, and Mg; and i, j, k, l, and m each satisfy $0 \leq i < 1.0$, $0 < j \leq 1.0$, $0 < k \leq 0.04$, $0.8 \leq i+j+k \leq 1.2$, $0.8 \leq l \leq 1.2$, and $2.5 \leq m \leq 3.2$, when the molar ratio of Al is defined as 1.

Among the alkaline earth metal elements in the raw material mixture, the molar ratio (parameter i in the formula (Ia)) of the element $M^a$ selected from the group consisting of Ca, Ba, and Mg may be in a range of 0.01 or more and 0.5 or less ($0.01 \leq i \leq 0.5$), may be in a range of 0.05 or more and 0.45 or less ($0.05 \leq i \leq 0.45$), and may be in a range of 0.1 or more and 0.4 or less ($0.1 \leq i \leq 0.4$), when the molar ratio of aluminum in the raw material mixture is defined as 1.

Among the alkaline earth metal elements in the raw material mixture, the molar ratio (parameter j in the formula (Ia)) of Sr is preferably in a range of more than 0 and 1 or less ($0 < j \leq 1.0$), more preferably in a range of 0.5 or more and 1.0 or less ($0.5 \leq j \leq 1.0$), even more preferably in a range of 0.6 or more and 0.9 or less ($0.6 \leq j \leq 0.9$), when the molar ratio of aluminum in the raw material mixture is defined as 1, for the purpose of obtaining a nitride fluorescent material having a stable crystal structure and a desired chromaticity.

Europium is an activating element for the nitride fluorescent material to be obtained. The molar ratio (parameter k in the formula (Ia)) of europium in the raw material mixture is preferably in a range of more than 0 and 0.04 or less ($0 < k \leq 0.04$), more preferably in a range of 0.0001 or more and 0.033 or less ($0.0001 \leq k \leq 0.033$), even more preferably in a range of 0.001 or more and 0.0275 or less ($0.001 \leq k \leq 0.0275$), when the molar ratio of aluminum in the raw material mixture is defined as 1, for the purpose of obtaining a nitride fluorescent material having excellent light emission intensity.

The total molar ratio (the total of parameters i, j, and k in the formula (Ia)) of the alkaline earth metal elements (element $M^a$ and Sr) and europium is preferably in a range of 0.8 or more and 1.2 or less ($0.8 \leq i+j+k \leq 1.2$), more preferably in a range of 0.9 or more and 1.1 or less ($0.9 \leq i+j+k \leq 1.1$), when the molar ratio of aluminum in the raw material mixture is defined as 1.

The molar ratio (parameter l in the formula (Ia)) of silicon contained in the raw material mixture is preferably in a range of 0.8 or more and 1.2 or less ($0.8 \leq l \leq 1.2$), more preferably in a range of 0.9 or more and 1.1 or less ($0.9 \leq l \leq 1.1$), when the molar ratio of aluminum in the raw material mixture is defined as 1, for the purpose of obtaining a nitride fluorescent material having a stable crystal structure and a desired chromaticity.

The molar ratio (parameter m in the formula (Ia)) of nitrogen contained in the raw material mixture is preferably in a range of 2.5 or more and 3.2 or less ($2.5 \leq m \leq 3.2$), more preferably in a range of 2.6 or more and 3.1 or less ($2.6 \leq m \leq 3.1$), even more preferably in a range of 2.7 or more and 3.0 or less ($2.7 \leq m \leq 3.0$), when the molar ratio of aluminum in the raw material mixture is defined as 1, for the purpose of obtaining a nitride fluorescent material having a stable crystal structure.

The raw material mixture may contain a flux. Examples of the flux may include alkaline earth metal halides. The flux may be added as a part of the raw materials for the nitride fluorescent material by controlling the elemental ratio of the cation contained in the flux so as to be in a composition of the nitride fluorescent material to be obtained, or after the raw materials have been blended so as to be in a composition of the desired nitride fluorescent material, the flux may be further added thereto.

The raw material mixture may be obtained by dry-mixing the raw materials using any of a ball mill, a Henschel mixer, a V-type blender, or a mortar with pestle, or may be obtained by wet-mixing the raw materials with a solvent or the like added thereto.

Heat Treatment

The resulting raw material mixture can be heat-treated to obtain the nitride fluorescent material. The temperature for heat-treating the raw material mixture is preferably in a range of 1,200° C. or more and 2,200° C. or less. The temperature for heat-treating the raw material mixture is more preferably 1,500° C. or more, even more preferably 1,900° C. or more. In addition, the temperature for heat-treating the raw material mixture is more preferably 2,100° C. or less, even more preferably 2,050° C. or less. When the raw material mixture is heat-treated at a temperature equal to or higher than a predetermined value, europium (Eu) can readily penetrate into the crystal structure to promote the crystal growth, and a fluorescent material having a relatively large particle diameter and excellent light emission intensity can be formed. In addition, when the temperature for heat-treating the raw material mixture is equal to or lower than a predetermined temperature, the decomposition of the crystal structure to be formed can be suppressed, and a nitride fluorescent material having a crystal structure with few defects can be obtained.

The raw material mixture may be heat-treated at a constant temperature, and may be heat-treated in multiple stages of heat treatment in which a plurality of heat treatment temperatures are set. When the heat treatment is performed in multiple stages, for example, the first heat treatment may be performed in a range of 800° C. or more and 1,400° C. or less, and then, after gradually rising the temperature, the second heat treatment may be performed in a range of 1,500° C. or more and 2,100° C. or less. The time for rising the temperature in the heat treatment may be, for example, in a range of 1 hour or more and 48 hours or less, may be in a range of 2 hours or more and 24 hours or less, and may be in a range of 3 hours or more and 20 hours or less. When the time for rising the temperature falls within the predetermined range, the crystal growth tends to proceed sufficiently, and Eu readily penetrates into the crystal structure.

A retention time at a predetermined temperature may be provided in the heat treatment of the raw material mixture. The retention time at a predetermined temperature in the heat treatment may be, for example, in a range of 0.5 hour or more and 48 hours or less, may be in a range of 1 hour or more and 30 hours or less, and may be in a range of 2 hours or more and 20 hours or less. When the retention time at a predetermined temperature is provided, the decomposition of the crystal can be suppressed, and the crystal growth can be further promoted.

In the heat treatment of the raw material mixture, the time for lowering the predetermined temperature of the resulting heat-treated product to room temperature is, for example, in a range of 0.1 hour or more and 20 hours or less, and is preferably in a range of 1 hour or more and 15 hours or less, more preferably in a range of 3 hours or more and 12 hours or less. During the period when the predetermined temperature of the resulting heat-treated product is lowered to room temperature, a retention time for retaining the heat-treated product at a predetermined temperature may be provided. When the retention time of the heat-treated product at a predetermined temperature is provided, the crystal structure is stabilized, and a nitride fluorescent material having high light emission intensity can be obtained. The retention time in lowering the temperature of the resulting heat-treated product is, for example, in a range of 0.1 hour or more and 20 hours or less, and is preferably in a range of 1 hour or more and 10 hours or less. The temperature of the retention time in lowering the temperature of the resulting heat-treated product is, for example, in a range of 1,000° C. or more and less than 1,800° C., and is preferably in a range of 1,200° C. or more and 1, 700° C. or less.

The heat treatment of the raw material mixture can be performed using, for example, a gas-pressurized electric furnace. The heat treatment can be performed by filling the raw material mixture in a crucible or a boat made of a material selected from the group consisting of a carbon material such as graphite, a boron nitride (BN) material, an alumina ($Al_2O_3$) material, and a molybdenum (Mo) material. For the purpose of suppressing the contamination of impurities in the resulting nitride fluorescent material, the heat treatment of the raw material mixture is preferably performed by using a crucible or a boat made of a boron nitride material.

The heat treatment of the raw material mixture may be carried out preferably in an atmosphere containing a nitrogen gas, more preferably an atmosphere containing substantially a nitrogen gas alone. When the atmosphere in the heat treatment is an atmosphere containing a nitrogen gas, the decomposition of the nitride fluorescent material formed by the heat treatment can be also suppressed. When the atmosphere in the heat treatment is an atmosphere containing a nitrogen gas, the atmosphere may further contain a rare gas such as argon, neon, or helium, and any other gas such as hydrogen, carbon dioxide, carbon monoxide, oxygen, or ammonia, in addition to the nitrogen gas. When the heat treatment is carried out in an atmosphere containing a nitrogen gas, the content of the nitrogen gas in the atmosphere is, for example, 90% by volume or more, and is preferably 95% by volume or more. By controlling the content of a gas containing elements other than nitrogen to a predetermined value or less, lowering of the light emission intensity of the fluorescent material due to the formation of impurities in the gas components can be suppressed.

The pressure at which the heat treatment of the raw material mixture is carried out may be, for example, normal pressure to 200 MPa in terms of a gauge pressure. From the viewpoint of suppressing the decomposition of the formed nitride fluorescent material, the pressure is preferably higher, and is preferably in a range of 0.1 MPa or more and 200 MPa or less, more preferably in a range of 0.6 MPa or more and 1.2 MPa or less, since there the restriction of industrial equipment is also reduced.

The heat-treated product obtained by heat-treating the raw material mixture may be granulated in combination with treatments such as grinding and classification. Through the granulation step, fluorescent material particles having a desired particle diameter can be obtained. Specifically, the resulting heat-treated product is coarsely ground (also referred to as "crushed"), and then further ground to have a predetermined particle diameter, using an ordinary grinding machine such as a ball mill, a jet mill, or a vibration mill. In the case where particles having different particle diameters exist after grinding, the particles may be classified to obtain a nitride fluorescent material having a desired particle diameter. The heat-treated product before and after classification may be subjected to a washing treatment by bringing it into contact with a deionized water, an acid solution, or a basic solution, for the purpose of removing thermally decomposed products adhered on the surface of the heat-treated product.

Specifically, for example, by heat-treating a raw material mixture prepared by mixing compounds that contain elements so as to be a composition ratio of Sr:Ca:Eu:Al:Si=0.878:0.097:0.025:1.0:1.0, a nitride fluorescent material having a composition in which the charge-in composition ratio of the elements is reflected on the content ratio of Sr, Ca, Eu, Al, and Si can be obtained. Here, the nitride fluorescent material obtained by heat-treating a raw material mixture may contain an oxygen component contained in the raw materials, or may have a composition ratio slightly different from the charge-in composition ratio due to decomposition or scattering of elements contained in the raw materials during the heat treatment. By changing the blending ratio of the raw materials, the composition of the desired nitride fluorescent material can be changed.

Nitride Fluorescent Material

The resulting nitride fluorescent material contains at least one alkaline earth metal element, europium, silicon, aluminum, and nitrogen in the composition, and may contain oxygen in the composition. In the resulting nitride fluorescent material, it is preferable that, when the molar ratio of aluminum contained in the composition is defined as 1, the total molar ratio of the at least one alkaline earth metal element and europium is in a range of 0.8 or more and 1.1 or less, the molar ratio of silicon is in a range of 0.9 or more and 1.1 or less, the molar ratio of nitrogen is in a range of 2.7 or more and 3.0 or less, and the total molar ratio of nitrogen and oxygen is in a range of 2.7 or more and 3.1 or less when oxygen is contained. The resulting nitride fluorescent material contains at least one of Sr and Ca as an alkaline earth metal element, and preferably contains Sr. More preferably, the nitride fluorescent material contains Sr and at least one element $M^a$ selected from the group consisting of Ca, Ba, and Mg. The element $M^a$ preferably contains at least Ca for the purpose of enhancing the light emission intensity. In the case where the element $M^a$ contains Ca, the molar ratio of Ca in the element $M^a$ is preferably 85 mol % or more, more preferably 90 mol % or more, and may be 100 mol %, when the amount of the element $M^a$ is defined as 1 mol. In the resulting nitride fluorescent material, each molar ratio of the element $M^a$, Sr, Eu, Si, and N may be in the following range. The molar ratio (parameter s in the formula (I)) of the element $M^a$ may be in a range of 0.1 or more and 0.3 or less ($0.1 \leq s \leq 0.3$), may be in a range of 0.105 or more and 0.20 or less ($0.105 \leq s \leq 0.20$), may be in a range of 0.105 or more and 0.110 or less ($0.105 \leq s \leq 0.110$), and may be in a range of 0.105 or more and 0.106 or less ($0.105 \leq s \leq 0.106$).

In the nitride fluorescent material, the molar ratio (parameter t in the formula (I)) of Sr may be in a range of 0.7 or more and 0.85 or less ($0.7 \leq t \leq 0.85$), may be in a range of 0.75 or more and 0.80 or less ($0.75 \leq t \leq 0.80$), may be in a range of 0.76 or more and 0.79 or less ($0.76 \leq t \leq 0.79$), and may be in a range of 0.78 or more and 0.79 or less ($0.78 \leq t \leq 0.79$).

The molar ratio (parameter u in the formula (I)) of Eu may be in a range of 0.005 or more and 0.040 or less ($0.005 \leq u \leq 0.040$), may be in a range of 0.005 or more and 0.035 or less ($0.005 \leq u \leq 0.035$), may be in a range of 0.01 or more and 0.03 or less ($0.01 \leq u \leq 0.03$), and may be in a range of 0.02 or more and 0.03 or less ($0.02 \leq u \leq 0.03$).

The total molar ratio (the total of parameters s, t, and u) of the element $M^a$, Sr, and Eu may be in a range of 0.85 or more and 1.10 or less ($0.85 \leq s+t+u \leq 1.10$), may be in a range of 0.90 or more and 1.00 or less ($0.90 \leq s+t+u \leq 1.00$), may be in a range of 0.91 or more and 0.95 or less ($0.91 \leq s+t+u \leq 0.95$), and may be in a range of 0.91 or more and 0.93 or less ($0.91 \leq s+t+u \leq 0.93$).

The total molar ratio (the total of parameters x and y) of N and O may be in a range of 2.6 or more and 3.2 or less ($2.6 \leq x+y \leq 3.2$), and may be in a range of 2.7 or more and 3.1 or less ($2.7 \leq x+y \leq 3.1$).

The molar ratio (parameter v in the formula (I)) of Si may be in a range of 0.900 or more and 1.100 or less ($0.900 \leq v \leq 1.100$), may be in a range of 1.000 or more and 1.080 or less ($1.000 \leq v \leq 1.080$), may be in a range of 1.020 or more and 1.070 or less ($1.020 \leq v \leq 1.070$), and may be in a range of 1.035 or more and 1.060 or less ($1.035 \leq v \leq 1.060$).

The molar ratio (parameter x in the formula (I)) of N may be in a range of 2.50 or more and 3.20 or less ($2.50 \leq x \leq 3.20$), may be in a range of 2.60 or more and 3.10 or less ($2.60 \leq x \leq 3.10$), may be in a range of 2.70 or more and 3.00 or less ($2.70 \leq x \leq 3.00$), may be in a range of 2.80 or more and 3.00 or less ($2.80 \leq x \leq 3.00$), and may be in a range of 2.85 or more and 2.99 or less ($2.85 \leq x \leq 2.99$).

The molar ratio (parameter y in the formula (I)) of oxygen (O) may be in a range of 0 or more and 0.065 or less ($0 \leq y \leq 0.065$), and may be in a range of 0 or more and 0.060 or less ($0 \leq y \leq 0.060$).

The resulting nitride fluorescent material preferably has a composition represented by the following formula (I).

$$M^a{}_s Sr_t Eu_u Si_v Al N_x O_y \quad (I)$$

wherein $M^a$ represents at least one element selected from the group consisting of Ca, Ba, and Mg; and s, t, u, v, x, and y each satisfy $0.10 \leq s \leq 0.30$, $0.70 \leq t \leq 0.85$, $0.005 \leq u \leq 0.040$, $0.85 \leq s+t+u \leq 1.10$, $0.90 \leq v \leq 1.10$, $2.5 \leq x \leq 3.2$, $0 \leq y \leq 0.065$, and $2.6 \leq x+y \leq 3.2$.

The volume average particle diameter Dm of the resulting nitride fluorescent material is preferably in a range of 20 μm or more and 40 μm or less, more preferably in a range of 22 μm or more and 35 μm or less, even more preferably in a range of 24 μm or more and 30 μm or less, still more preferably in a range of 24 μm or more and 28 μm or less. When the volume average particle diameter Dm of the resulting nitride fluorescent material falls within a range of 20 μm or more and 40 μm or less, the nitride fluorescent material readily absorbs excitation light to emit fluorescence having a desired chromaticity, and the light emission efficiency can be improved. The volume average particle diameter Dm of the nitride fluorescent material refers to a volume average particle diameter (median diameter: Dm) at which the cumulative frequency from the small diameter side reaches 50% in the volume-based particle size distribution measured using a laser diffraction particle size distribution measuring apparatus (for example, product name: Mastersizer 3000, manufactured by Malvern Instruments Ltd.).

The nitride fluorescent material preferably absorbs light in a wavelength range of 250 nm or more and less than 410 nm, or in a wavelength range of 410 nm or more and 480 nm or less to emit fluorescence of which the light emission peak wavelength is in a range of 600 nm or more and 670 nm or less, more preferably in a range of 610 nm or more and 660 nm or less. The nitride fluorescent material is preferably excited by light having a light emission peak wavelength in a range of 420 nm or more and 470 nm or less to emit light of which the light emission peak wavelength is in a range of 610 nm or more and 660 nm or less. The full width at half maximum in the light emission spectrum of the nitride fluorescent material is, for example, in a range of 70 nm or more and 95 nm or less, and is preferably in a range of 70 nm or more and 90 nm or less, more preferably in a range of 70 nm or more and 80 nm or less. The full width at half maximum refers to a full width at half maximum (FWHM) of a light emission peak in a light emission spectrum, and is a wavelength width of a light emission peak that indicates a value of 50% of the maximum value of the light emission peak in a light emission spectrum.

The nitride fluorescent material can be used in a light emitting device used for illumination devices, backlights for liquid-crystal display devices, and the like, in combination with an excitation light source such as an LED or an LD.

As the excitation light source used for the light emitting device, an excitation light source that emits light having a wavelength range of 400 nm or more and 570 nm or less can be used. By using the excitation light source having the wavelength range, a light emitting device having a high light emission intensity of the nitride fluorescent material can be provided. The light emitting element to be used as the excitation light source for the light emitting device preferably has a light emission peak wavelength in a range of 400 nm or more and 500 nm or less, more preferably in a range of 410 nm or more and 480 nm or less.

As the light emitting element, a semiconductor light emitting element using a nitride-based semiconductor ($In_X Al_Y Ga_{1-X-Y} N$, $0 \leq X$, $0 \leq Y$, $X+Y \leq 1$) is preferably used. When the semiconductor light emitting element is used as the excitation light source for the light emitting device, a stable light emitting device having a high output linearity relative to input with high efficiency and highly resistant to mechanical shock can be obtained. The full width at half maximum in the light emission spectrum of the light emitting element is, for example, preferably 30 nm or less.

The light emitting device can use, for example, a nitride fluorescent material having a composition represented by the formula (I), which is produced by the above producing method. The light emitting device may use a fluorescent material other than the nitride fluorescent material. For example, the nitride fluorescent material may be used as a first fluorescent material, and a second fluorescent material having a light emission peak wavelength different from that of the first fluorescent material may be used. As for the first fluorescent material, one kind of fluorescent material may be used alone, or two or more kinds of fluorescent materials may be used in combination, as long as the fluorescent material has a light emission peak wavelength in a targeted wavelength range. Also, as for the second fluorescent material, one kind of fluorescent material may be used alone, or two or more kinds of fluorescent materials may be used in combination, as long as the fluorescent material has a light emission peak wavelength in a targeted wavelength range.

EXAMPLES

The present disclosure will be hereunder specifically described by reference to the following Examples. However, the present disclosure is not limited to these Examples.

Preparation of $SrH_2$

Metal Sr was placed on an alumina boat in a glove box under an inert (Ar) atmosphere, and this was heat-treated at 500° C. for 12 hours in a tubular furnace under an argon atmosphere containing hydrogen (Ar flow rate: 17 L/min, $H_2$ flow rate: 0.5 L/min). Then, the heat-treated product was mixed by coarse grinding. The heat treatment and the coarse grinding were repeated four times. Thereafter, the resulting product was ground using a mortar with pestle and classified in a glove box under an inert (Ar) atmosphere to obtain a powder. The X-ray diffraction (XRD) spectrum of the resulting powder was measured using a multipurpose X-ray diffraction system (product name: Ultima IV, manufactured by Rigaku Corporation, X-ray source: CuKα ray (λ=1.5418 Å), tube voltage: 40 kV, tube current: 40 mA). From the X-ray diffraction spectrum of the resulting powder, it was confirmed that the powder was $SrH_2$.

Preparation of SrNH

Metal Sr was placed on an alumina boat in a glove box under an inert (Ar) atmosphere, and this was heat-treated at 400° C. for 12 hours in a tubular furnace under a nitrogen atmosphere containing hydrogen ($N_2$ flow rate: 17 L/min, $H_2$ flow rate: 0.5 L/min). Then, the heat-treated product was mixed by coarse grinding. The heat treatment and the coarse grinding were repeated three times. Thereafter, the resulting product was ground using a mortar with pestle and classified in a glove box under an inert (Ar) atmosphere to obtain a powder. The X-ray diffraction (XRD) spectrum of the resulting powder was measured using a multipurpose X-ray diffraction system (product name: Ultima IV, manufactured by Rigaku Corporation, X-ray source: CuKα ray (λ=1.5418 Å), tube voltage: 40 kV, tube current: 40 mA). From the X-ray diffraction spectrum of the resulting powder, it was confirmed that the powder was SrNH.

Example 1

The prepared $SrH_2$ and SrNH, $Ca_3N_2$, EuN, AlN, and $Si_3N_4$ were used as raw materials. Each compound was weighed in a glove box under an inert (Ar) atmosphere such that the molar ratio of each element was Sr:Ca:Eu:Al:Si=0.878:0.097:0.025:1.0:1.0 as a charge-in composition ratio, and then mixed to obtain a raw material mixture. The mixing was performed such that the content of $SrH_2$ was 75% by mass and the content of SrNH was 25% by mass relative to the total, which was 100% by mass, of the contents of $SrH_2$ and SrNH in the raw material mixture ($SrH_2$/SrNH=75% by mass/25% by mass). The raw material mixture was filled in a crucible made of boron nitride (BN), and was heat-treated at a gauge pressure of 0.92 MPa and a temperature in a range of 1,900° C. or more and 2,100° C. or less under a nitrogen gas ($N_2$ gas: 100% by volume) atmosphere. The heat treatment time was 0.5 hour, and after the heat treatment, the temperature was naturally cooled to room temperature without adjusting the temperature. The resulting heat-treated product was ground, dispersed in a deionized water, washed, and subjected to classification treatment, thereby obtaining a nitride fluorescent material of Example 1.

Example 2

A nitride fluorescent material of Example 2 was obtained in the same manner as in Example 1 except that the mixing was performed such that the content of $SrH_2$ was 50% by mass and the content of SrNH was 50% by mass relative to the total, which was 100% by mass, of the contents of $SrH_2$ and SrNH in the raw material mixture ($SrH_2$/SrNH=50% by mass/50% by mass).

Example 3

A nitride fluorescent material of Example 3 was obtained in the same manner as in Example 1 except that the mixing was performed such that the content of $SrH_2$ was 25% by mass and the content of SrNH was 75% by mass relative to the total, which was 100% by mass, of the contents of $SrH_2$ and SrNH in the raw material mixture ($SrH_2$/SrNH=25% by mass/75% by mass).

Comparative Example 1

A nitride fluorescent material of Comparative Example 1 was obtained in the same manner as in Example 1 except that $SrH_2$ and SrNH were not used, and instead, $SrN_u$ (mixture of $Sr_2N$ and SrN, u=approximately ⅔) was used as a raw material.

Reference Example 2

A nitride fluorescent material of Reference Example 2 was obtained in the same manner as in Example 1 except that SrNH was not used, and $SrH_2$ ($SrH_2$/SrNH=100% by mass/0% by mass) was used as a raw material.

Comparative Example 3

A nitride fluorescent material of Comparative Example 3 was obtained in the same manner as in Example 1 except that $SrH_2$ was not used, and SrNH ($SrH_2$/SrNH=0% by mass/100% by mass) was used as a raw material.

Volume Average Particle Diameter Dm

The particle size distribution of the nitride fluorescent material in each of Examples and Comparative Examples was measured by a laser diffraction method using a particle size distribution measuring apparatus (product name: Mastersizer 3000, manufactured by Malvern Instruments Ltd.), and the volume average particle diameter (median diameter: Dm) at which the cumulative frequency from the small diameter side reached 50% in the particle size distribution was measured. The results are shown in Table 1.

Light Emission Characteristics

The nitride fluorescent material in each of Examples and Comparative Examples was irradiated with light having a light emission peak wavelength of 450 nm, and the light emission spectrum thereof was measured using a quantum efficiency measurement system (product name: QE-2000, manufactured by Otsuka Electronics Co., Ltd.). From the obtained light emission spectrum, the relative light emission intensity (%) and the peak wavelength (λp: nm) were determined. The relative light emission intensity of each nitride fluorescent material was calculated when the light emission intensity at the light emission peak wavelength of the nitride fluorescent material in Comparative Example 1 was defined as 100%. The results are shown in Table 1.

TABLE 1

| | | | Light Emission Characteristics | |
| --- | --- | --- | --- | --- |
| | Sr Raw Material | Volume Average Particle Diameter Dm (μm) | Light Emission Peak Wavelength λp (nm) | Relative Light Emission Intensity (%) |
| Comparative Example 1 | $SrN_u$ | 18.2 | 632 | 100.0 |
| Reference Example 2 | $SrH_2$ = 100% | 24.3 | 632 | 100.1 |
| Example 1 | $SrH_2$/SrNH = 75%/25% | 25.2 | 632 | 100.9 |
| Example 2 | $SrH_2$/SrNH = 50%/50% | 25.6 | 631 | 101.2 |

TABLE 1-continued

| | Sr Raw Material | Volume Average Particle Diameter Dm (μm) | Light Emission Characteristics | |
|---|---|---|---|---|
| | | | Light Emission Peak Wavelength λp (nm) | Relative Light Emission Intensity (%) |
| Example 3 | SrH$_2$/SrNH = 25%/75% | 26.5 | 633 | 101.3 |
| Comparative Example 3 | SrNH = 100% | 25.6 | 632 | 100.0 |

The nitride fluorescent material obtained in each of Examples 1 to 3 had higher relative light emission intensity and larger volume average particle diameter Dm than those of the nitride fluorescent materials obtained in Comparative Examples 1 and 3. The nitride fluorescent material obtained in each of Examples 1 to 3 used SrH$_2$ and SrNH as raw materials. By using a hydride having a large mass ratio of Sr contained in one molecule and an amide compound having a large mass ratio of nitrogen contained in one molecule, Sr that was likely to be scattered was sufficiently supplied, and Sr and N that formed the framework of the crystal structure were sufficiently supplied to reduce the defects. Thus, the crystal growth was promoted, and the nitride fluorescent material having a large volume average particle diameter and improved light emission intensity could be obtained. The nitride fluorescent material obtained in Reference Example 2 used only a hydride having a large mass ratio of Sr contained in one molecule as a raw material. Thus, Sr that was likely to be scattered was supplied, and the light emission intensity thereof was slightly higher than those of the nitride fluorescent materials obtained in Comparative Examples 1 and 3.

SEM Micrograph

Using a scanning electron microscope (SEM, product name: SU3500, manufactured by Hitachi High-Technologies Corporation), SEM micrographs of the nitride fluorescent materials in Example 3 and Comparative Example 1 were obtained. FIG. 1 is a SEM micrograph of the nitride fluorescent material in Example 3, and FIG. 2 is a SEM micrograph of the nitride fluorescent material in Comparative Example 1.

Figure 2:
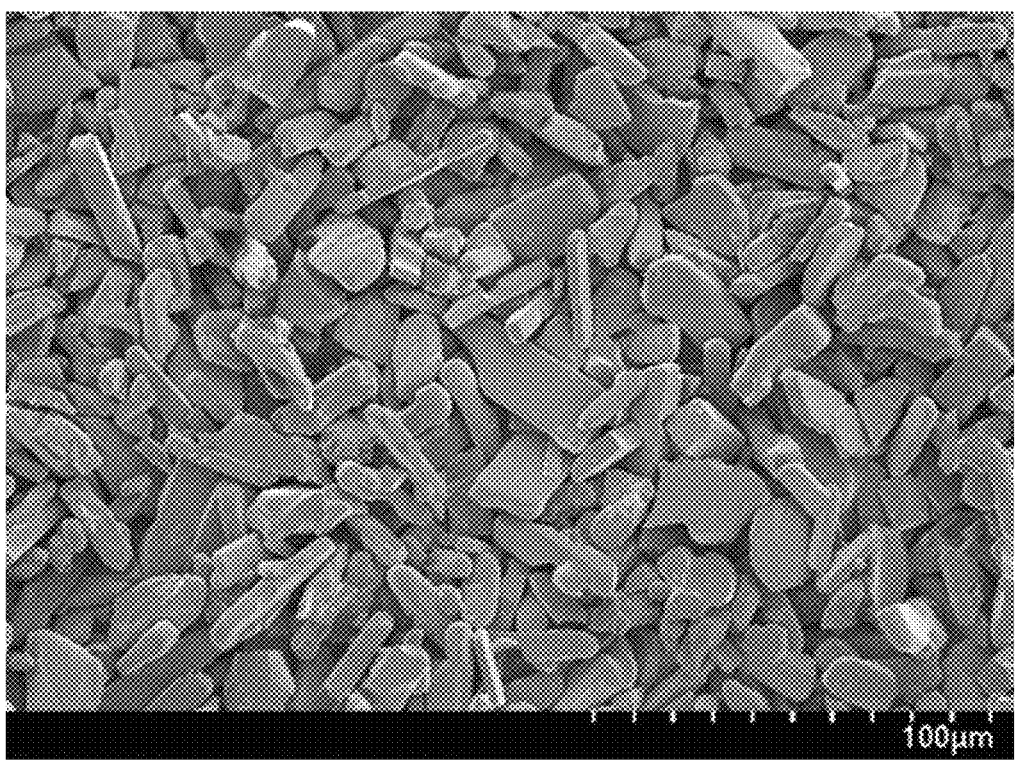
FIG. 2 is a SEM micrograph of a nitride fluorescent material according to Comparative Example 1 of the present disclosure.

It can be clearly confirmed that the individual particles of the nitride fluorescent material obtained in Example 3 as shown in FIG. 1 were larger than those of the nitride fluorescent material obtained in Comparative Example 1 as shown in FIG. 2.

Composition Analysis

Each constituent element of the nitride fluorescent material in each of Examples and Comparative Examples was analyzed using a scanning X-ray fluorescence (XRF) spectrometer (product name: ZSX Primus II, manufactured by Rigaku Corporation), an ion chromatography (IC) system (product name: Dionex Integrion HPIC, manufactured by Thermo Scientific Dionex Corporation), and an Oxygen/Nitrogen/Hydrogen analyzer (product name: EMGA-930, manufactured by HORIBA Ltd.); and the molar ratio of each element was then calculated. The molar ratio of each element was calculated when the molar ratio of Al contained in the composition was defined as 1. The results are shown in Table 2.

TABLE 2

| | Sr Raw Material | Analyzed Composition (Molar Ratio) | | | | | | |
|---|---|---|---|---|---|---|---|---|
| | | Sr | Ca | Eu | Al | Si | N | O |
| Comparative Example 1 | SrN$_u$ | 0.760 | 0.112 | 0.026 | 1 | 1.028 | 2.841 | 0.068 |
| Reference Example 2 | SrH$_2$ = 100% | 0.792 | 0.111 | 0.026 | 1 | 1.049 | 2.827 | 0.054 |
| Example 1 | SrH$_2$/SrNH = 75%/25% | 0.782 | 0.109 | 0.027 | 1 | 1.040 | 2.855 | 0.051 |
| Example 2 | SrH$_2$/SrNH = 50%/50% | 0.785 | 0.110 | 0.027 | 1 | 1.055 | 2.985 | 0.055 |
| Example 3 | SrH$_2$/SrNH = 25%/75% | 0.782 | 0.109 | 0.025 | 1 | 1.040 | 2.863 | 0.055 |
| Comparative Example 3 | SrNH = 100% | 0.780 | 0.109 | 0.027 | 1 | 1.042 | 2.909 | 0.052 |

The analyzed composition of the nitride fluorescent material obtained in each of Examples 1 to 3 were respectively fallen within the ranges of the composition represented by the formula (I).

The nitride fluorescent material obtained in each of Examples 1 to 3 used a hydride and an amide compound, each having a larger mass ratio of Sr contained in one molecule than that of a nitride, as raw materials. Therefore, the nitride fluorescent material obtained in each of Examples 1 to 3 had a larger molar ratio of Sr contained in the composition than those of the nitride fluorescent materials obtained in Comparative Example 1 using only a nitride and Comparative Example 3 using only an amide compound. From the results, it can be considered that, in the nitride fluorescent material obtained in each of Examples 1 to 3, Sr was sufficiently supplied to the composition of the fluorescent material.

The nitride fluorescent material obtained in each of Examples 1 to 3 used an amide compound having a larger mass ratio of nitrogen (N) contained in one molecule than those of a nitride and a hydride as a raw material. Therefore, the nitride fluorescent material obtained in each of Examples 1 to 3 had a larger molar ratio of nitrogen contained in the composition than those of the nitride fluorescent materials obtained in Comparative Example 1 using only a nitride and Reference Example 2 using only a hydride. From the results, it can be considered that, in the nitride fluorescent material obtained in each of Examples 1 to 3, nitrogen was sufficiently supplied to the composition of the fluorescent material.

The nitride fluorescent material obtained in each of Examples 1 to 3 had a lower molar ratio of oxygen than that of the nitride fluorescent material obtained in Comparative Example 1 using a nitride containing no hydrogen as a raw material. From the results, it is presumed that, since the nitride fluorescent material obtained in each of Examples 1 to 3 used a hydride and an amide compound as raw materials, hydrogen contained in the raw material readily reacted with oxygen contained as an impurity during the heat treatment and scattered as water (H$_2$O), thereby lowering the molar ratio of oxygen contained in the composition.

The nitride fluorescent material according to the embodiment of the present disclosure can be favorably used for light emitting devices applicable to light sources for illumination, LED displays, backlight sources for liquid crystal displays, traffic lights, illumination switches, light sources for projectors, various sensors, various indicators.

The invention claimed is:

1. A method for producing a nitride fluorescent material, comprising:

preparing a raw material mixture comprising a hydride containing at least one first alkaline earth metal element, at least one compound containing at least one second alkaline earth metal element and selected from the group consisting of an amide compound and an imide compound, a compound containing europium, a compound containing aluminum, and a compound containing silicon, wherein at least one of the compound containing europium, the compound containing aluminum, and the compound containing silicon is a nitride; and subjecting the raw material mixture to a heat treatment to obtain the nitride fluorescent material.

2. The method for producing a nitride fluorescent material according to claim 1, wherein the raw material mixture comprises a nitride containing europium, a nitride containing aluminum, a nitride containing silicon, and optionally a nitride containing at least one alkaline earth metal element.

3. The method for producing a nitride fluorescent material according to claim 1, wherein a molar ratio of europium in the raw material mixture is in a range of more than 0 and 0.04 or less, a total molar ratio of the at least one first alkaline earth metal element, the at least one second alkaline earth metal element, and europium in the raw material mixture is in a range of 0.8 or more and 1.2 or less, and a molar ratio of silicon in the raw material mixture is in a range of 0.8 or more and 1.2 or less, when a molar ratio of aluminum in the raw material mixture is defined as 1.

4. The method for producing a nitride fluorescent material according to claim 1, wherein the hydride comprises at least one of Sr and Ca, and the at least one compound containing at least one second alkaline earth metal element and selected from the group consisting of an amide compound and an imide compound comprises at least one of Sr and Ca.

5. The method for producing a nitride fluorescent material according to claim 4, wherein the hydride is at least one selected from the group consisting of $SrH_2$, $CaH_2$, $(Sr,Ca)H_2$, and $(Sr,Ca,Eu)H_2$.

6. The method for producing a nitride fluorescent material according to claim 4, wherein the at least one compound containing at least one second alkaline earth metal element and selected from the group consisting of an amide compound and an imide compound is at least one selected from the group consisting of $Sr(NH_2)_2$, $Ca(NH_2)_2$, $(Sr,Ca)(NH_2)_2$, $(Sr,Ca,Eu)(NH_2)_2$, SrNH, CaNH, (Sr,Ca)NH, and (Sr,Ca,Eu)NH.

7. The method for producing a nitride fluorescent material according to claim 1, wherein a blending ratio of the hydride relative to a total, which is 100% by mass, of the hydride and the at least one compound containing at least one second alkaline earth metal element and selected from the group consisting of an amide compound and an imide compound is in a range of 20% by mass or more and 80% by mass or less.

8. The method for producing a nitride fluorescent material according to claim 1, wherein the nitride fluorescent material has a composition represented by the following formula (I):

$$M_s^a Sr_t Eu_u Si_v Al N_x O_y \qquad (I)$$

wherein $M^a$ represents at least one element selected from the group consisting of Ca, Ba, and Mg; and s, t, u, v, x, and y each satisfy $0.10 \leq s \leq 0.30$, $0.70 \leq t \leq 0.85$, $0.005 \leq u \leq 0.040$, $0.85 \leq s+t+u \leq 1.10$, $0.90 \leq v \leq 1.10$, $2.5 \leq x \leq 3.2$, $0 \leq y \leq 0.065$, and $2.6 \leq x+y \leq 3.2$.

9. The method for producing a nitride fluorescent material according to claim 1, wherein a temperature of the heat treatment is in a range of 1,200° C. or more and 2,200° C. or less.

10. The method for producing a nitride fluorescent material according to claim 1, wherein the heat treatment is carried out in an atmosphere comprising nitrogen gas, and wherein a pressure of the atmosphere is in a range of 0.1 MPa or more and 200 MPa or less.

* * * * *